United States Patent Office 3,350,193
Patented Oct. 31, 1967

3,350,193
DERIVATIVES OF PYRIDAZONE COMPOUNDS
Franz Reicheneder, Ludwigshafen (Rhine), and Adolf Fischer, Mutterstadt, Pfalz, Germany, and Karl Dury, deceased, late of Kirchheimbolanden, Germany, by Johanna Maria Dury, heiress-at-law, Kirchheimbolanden, Germany, assignors to Badische Anilin- & Soda-Fabrik Aktiengesellschaft, Ludwigshafen (Rhine), Germany
No Drawing. Filed Jan. 7, 1965, Ser. No. 424,139
Claims priority, application Germany, Jan. 16, 1964,
B 75,014
6 Claims. (Cl. 71—92)

This invention relates to pyridazone derivatives. More particularly, it relates to pyridazone derivatives which bear a methoxy group in 5-position as a substituent. These substances have good herbicidal activity; in particular, they have selective activity on weeds among crop plants. When used for the total destruction of plants, they exhibit short residual action in the soil.

It is known that pyridazone derivatives, e.g. 1-phenyl-4-amino-5-chloropyridazone-(6) (British Patent No. 871,-674) or 1 - phenyl - 4 - methoxy-5-chloropyridazone-(6) (British Patent No. 917,849) may be used for the control of weeds. The effectiveness of these compounds is however not satisfactory.

We have now found that 1-phenyl-4-amino-5-methoxypyridazone-(6) or 1 - cyclohexyl - 4 - amino-5-methoxypyridazone-(6) or their derivatives have considerable herbicidal activity.

Their special advantage consists in the fact that their action on grasses, e.g. annual meadow grass, wild oats and slender foxtail, is distinctly stronger than that of prior art pyridazone derivatives. Moreover they are distinguished by considerably shorter residual action in the soil. This more rapid degradation in the soil makes more rapid crop rotation in the treated area possible. In large doses they may be used for the total destruction or total prevention of unwanted vegetation. The rate of application is 1 to 10 kg. per hectare.

By derivatives we understand in particular
(a) the salts with organic or inorganic acids or acid phenols, e.g. formic acid, acetic acid, propionic acid, α,α-dichloropropionic acid, α,α-dichlorobutyric acid, trichloroacetic acid, p-toluenesulfonic acid, benzenesulfonic acid, hydrochloric acid, sulfuric acid, phosphoric acid, nitric acid, substituted phenoxyacetic acids, substituted phenoxypropionic acids, chlorophenols, nitrophenols, oxalic acid, mucochloric acid, maleic acid, monochloromaleic acid or dichloromaleic acid;

(b) furthermore the amides or imides, i.e. amides from 1 - phenyl-4-amino-5-methoxypyridazone-(6) or 1-cyclohexyl - 4 - amino-5-methoxypyridazone-(6) and organic acids or acid derivatives, e.g. acid anhydrides, or acid chlorides or sulfonic acid chlorides, e.g. of the following acids: formic acid, acetic acid, monochloroacetic acid, dichloroacetic acid, trichloroacetic acid, propionic acid, α,α-dichloropropionic acid, butyric acid, α,α-dichlorobutyric acid, oxalic acid, succinic acid, maleic acid, phthalic acid, p-toluenesulfonic acid;

(c) heavy metal complex salts, e.g. with copper acetate;

(d) the corresponding amidines and azomethines, e.g. reaction products of 1 - phenyl - 4-amino-5-methoxypyridazone - (6) or 1 - cyclohexyl-4-amino-5-methoxypyridazone-(6) with aldehyde, e.g. formaldehyde, acetaldehyde, chloral, propionaldehyde, benzaldehyde, salicylaldehyde, glucose, or with amides, e.g. dimethyl formamide or N-methylpyrrolidone;

(e) reaction products with ketones, ureas or isocyanates, e.g. phenyl isocyanate, and (f) substitution products, e.g. N-alkyl derivatives.

The agents according to this invention are prepared by mixing the active substances with, or dissolving them in, conventional solid or liquid extenders or diluents. Examples of such extenders or diluents are: clays, bentonite, borax, fertilizers, water, alcohols, polyalcohols, hydrocarbons, chlorohydrocarbons, amides, e.g. N-methylpyrrolidone, dimethyl sulfoxide, sulfolan (=tetramethylenesulfone). They may also be mixed with conventional dispersing agents or adhering agents.

Examples of the active ingredients for the agents according to this invention are:

| | Melting point, °C. |
|---|---|
| 1-phenyl-4-amino-5-methoxypyridazone-(6) | 192 to 193 |
| 1 - cyclohexyl-4-amino-5-methoxypyridazone-(6) | 172 to 173 |
| 1 - phenyl - 4-diacetylamino-5-methoxypyridazone-(6) | 141 to 142 |
| 1 - phenyl - 4-isopropylamino - 5-methoxypyridazone-(6) | 143 to 145 |
| 1 - phenyl - 4 - phenylureido - 5-methoxypyridazone-(6) | 207 to 208 | having the following formula

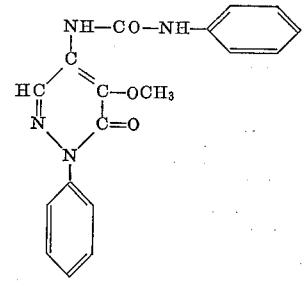

1 - phenyl - 4 - amino-5-methoxypyridazone-(6)-dimethylformamidine _____ 94 to 95 having the following formula

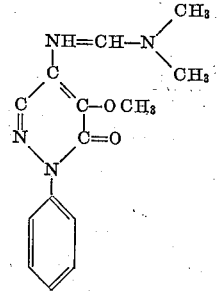

1 - phenyl - 4-α-hydroxy-β,β,β-trichloroethyl-amino-5-methoxy-pyridazone-(6)

Analysis.—Found: Cl, 29.0%. Calculated: Cl, 29.2%.

The pyridazone derivatives to be used according to this invention may be prepared in various ways. They may for example be prepared by hydrogenation of the corresponding 4-nitro-5-alkoxypyridazones or by alkylation of the corresponding 4-amino-5-hydroxypyridazones, if desired in the form of amides, or for example by reaction of 4-amino-5-halopyridazones with alcoholates. 1-phenyl-4-amino-5-methoxypyridazone-(6), for example, is obtained from 1-phenyl-4-nitro-5-methoxypyridazone by hydrogenation, for example under the action of a nickel contact catalyst in aqueous alcoholic solution with hydrogen, if desired under superatmospheric pressure.

The scope of application of the agents according to this invention may be varied by adding substances having bactericidal, fungicidal or plant-growth regulating properties, or by mixing with fertilizers.

The following examples are to illustrate the activity of the agents according to this invention.

EXAMPLE 1

In a greenhouse, beet (*Beta vulgaris*), slender foxtail (*Alopecurus myosuroides*), wild oats (*Avena fatua*), annual meadow grass (*Poa annua*), white mustard (*Sinapis alba*), vetch (*Vicia spp.*), cleavers (*Galium aparine*), lamb's quarters (*Chenopodium album*), small nettle (*Urtica urens*), and knot grass (*Polygonum spp.*) were seeded in plastic pots 8 cm. in diameter and sprayed on the same day with the compounds 1-phenyl-4-amino-5-methoxypyridazone-(6)(I), 1-phenyl-4-amino-5-chloropyridazone-(6)(II) and 1-phenyl-4-methoxy-5-chloropyridazone-(6)(III) at a rate of 2 kg. of active substance per hectare, dispersed in 500 liters of water per hectare using sodium lignosulfonate as dispersant. After 3 weeks it was found that 1-phenyl-4-amino-5-methoxypyridazone-(6)(I) has better herbicidal activity than 1-phenyl-4-amino-5-chloropyridazone-(6)(II), particularly against vetch (*Vicia spp.*), cleavers (*Galium aparine*), annual meadow grass (*Poa annua*), wild oats (*Avena fatua*) and slender foxtail (*Alopecurus myosuroides*). Both agents did not cause damage to beet. In contrast to 1-phenyl-4-amino-5-methoxypyridazone-(6)(I), 1-phenyl-4-methoxy-5-chloropyridazone-(6)(III) had no compatibility with beet.

|  | Active ingredient | | |
| --- | --- | --- | --- |
|  | I | II | III |
| Crop plant: beet | 0 | 0 | 70 |
| Unwanted plants: | | | |
| Slender foxtail | 90 | 40–60 | 50 |
| Wild oats | 80–90 | 20–30 | 30–40 |
| Annual meadow grass | 100 | 40–50 | 40 |
| White mustard | 80–100 | 70 | 70–80 |
| Vetch | 90 | 50–60 | 60 |
| Cleavers | 70–90 | 50 | 50 |
| Lamb's quarters | 100 | 80–90 | 80 |
| Small nettle | 100 | 80–100 | 80 |
| Knot grass | 100 | 80–90 | 90 |

0=No damage; 100=Total destruction.

The following compounds have an activity similar to that of 1-phenyl-4-amino-5-methoxypyridazone-(6):

1-cyclohexyl-4-amino-5-methoxypyridazone-(6)
1-phenyl-4-diacetylamino-5-methoxypyridazone-(6)
1-phenyl-4-isopropylamino-5-methoxypyridazone-(6)
1-phenyl-4-phenylureido-5-methoxypyridazone-(6)
1-phenyl-4-amino-5-methoxypyridazone-(6)-dimethylformamidine
1-phenyl-4-α-hydroxy-β,β,β-trichloroethylamino-5-methoxypyridazone-(6)

EXAMPLE 2

White mustard (*Sinapis alba*), lamb's quarters (*Chenopodium album*), small nettle (*Urtica urens*), vetch (*Vicia spp.*), chickweed (*Stellaria media*), knot grass (*Polygonum spp.*) and annual meadow grass (*Poa annua*) having a height of 4 to 8 cm. were sprayed out of doors with the compounds 1-phenyl-4-amino-5-methoxypyridazone-(6)(I) and 1-phenyl-4-amino-5-chloropyridazone-(6)(II) at a rate of 7.5 kg. of active substance per hectare, dispersed in 500 liters of water per hectare using sodium lignosulfonate as dispersant. After 4 weeks all weeds were almost completely destroyed. Subsequently barley was seeded. The plants in the lot treated with active substance (I) showed no damage on emergence and after further growth. There was practically no weed growth even at the harvest. The barley grown in the lot treated with active substance II showed distinct damage. The residual action of 1-phenyl-4-amino-5-methoxypyridazone-(6)(I) is shorter than that of 1-phenyl-4-amino-5-chloropyridazone-(6)(II), the rates of application being equal.

We claim:

1. Compounds having the formula

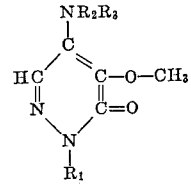

wherein $R_1$ denotes phenyl or cyclohexyl and wherein
(1) $R_2$ denotes hydrogen and $R_3$ denotes a member selected from the group consisting of hydrogen, lower alkyl, lower chlorinated alkyl, α-hydroxy-β,β,β-trichloroethyl, the group

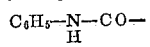

and the group

(2) $R_1$ and $R_2$ together denote a member selected from the group consisting of an imine ring system having the formula

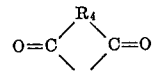

wherein $R_4$ is selected from the group consisting of alkyl of from 0 to 2 carbon atoms,

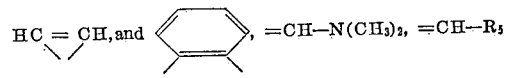

wherein $R_5$ is selected from the group consisting of lower alkyl, phenyl and o-hydroxyphenyl and salts of these compounds with an acid selected from the group consisting of inorganic acid, lower aliphatic carboxylic acid, chlorinated lower aliphatic carboxylic acid, benzene sulfonic acid having lower alkyl substituent groups, phenoxyacetic or phenoxypropionic acid, phenol having chlorine or nitro substituents, oxalic acid, mucochloric acid, maleic acid, monochloromaleic acid and dichloromaleic acid, and heavy metal complex salts.

2. A process for the control of unwanted vegetation wherein a compound as claimed in claim 1 is allowed to act on the plants.

3. 1-phenyl-4-amino-5-methoxypyridazone-(6).

4. 1-cyclohexyl-4-amino-5-methoxypyridazone-(6).

5. 1 - phenyl-4-amino-5-methoxypyridazone-6-dimethylformamidine.

6. 1-phenyl-4-phenylureido-5-methoxypyridazone-6.

References Cited

UNITED STATES PATENTS 3,210,353  10/1965  Reicheneder et al. __ 260—250 X

NICHOLAS S. RIZZO, *Primary Examiner.*

UNITED STATES PATENT OFFICE

CERTIFICATE OF CORRECTION

Patent No. 3,350,193　　　　　　　　　　　October 31, 1967

Franz Reicheneder et al.

It is certified that error appears in the above identified patent and that said Letters Patent are hereby corrected as shown below:

Column 4, lines 9 to 15, the formula should appear as shown below:

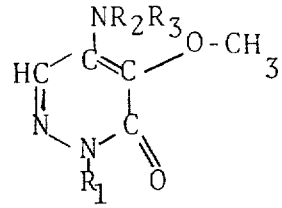

Signed and sealed this 5th day of August 1969.

(SEAL)
Attest:

Edward M. Fletcher, Jr.

Attesting Officer

WILLIAM E. SCHUYLER, JR.

Commissioner of Patents